United States Patent
Giaconi et al.

(10) Patent No.: US 10,699,048 B2
(45) Date of Patent: *Jun. 30, 2020

(54) APPLICATION SPECIFIC INTEGRATED CIRCUIT LINK

(71) Applicant: CHRONOS TECH LLC, San Diego, CA (US)

(72) Inventors: Stefano Giaconi, San Diego, CA (US); Giacomo Rinaldi, San Diego, CA (US)

(73) Assignee: CHRONOS TECH LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,627

(22) Filed: Nov. 4, 2019

(65) Prior Publication Data

US 2020/0065450 A1 Feb. 27, 2020

Related U.S. Application Data

(63) Continuation of application No. 15/876,059, filed on Jan. 19, 2018, now Pat. No. 10,467,369, which is a continuation of application No. 15/344,420, filed on Nov. 4, 2016, now Pat. No. 9,977,853.

(60) Provisional application No. 62/251,000, filed on Nov. 4, 2015, provisional application No. 62/372,221, filed on Aug. 8, 2016, provisional application No.
(Continued)

(51) Int. Cl.
*G06F 30/34* (2020.01)
*G06F 13/42* (2006.01)
*H04L 12/40* (2006.01)
*G06F 30/30* (2020.01)
*G06F 119/12* (2020.01)

(52) U.S. Cl.
CPC .............. *G06F 30/34* (2020.01); *G06F 13/42* (2013.01); *G06F 13/4295* (2013.01); *G06F 30/30* (2020.01); *H04L 12/40006* (2013.01); *G06F 2119/12* (2020.01)

(58) Field of Classification Search
CPC .. G06F 13/42; G06F 13/4295; G06F 17/5054; H04L 12/40006; H04L 47/10
See application file for complete search history.

(56) References Cited

U.S. PATENT DOCUMENTS

| 4,189,625 A | 2/1980 | Strandberg |
| 5,689,644 A | 11/1997 | Chou et al. |
| 6,208,644 B1 | 3/2001 | Pannell et al. |

(Continued)

*Primary Examiner* — David B Lugo
(74) *Attorney, Agent, or Firm* — Procopio, Cory, Hargreaves & Savitch LLP; Mark W. Catanese

(57) ABSTRACT

Systems and methods for application specific integrated circuit design using Chronos links are disclosed. A Chronos Link is an ASIC on-chip and off-chip interconnect communication protocol that allows interfaces to transmit and receive information. The protocol may utilize messages or signals to indicate the availability and/or readiness of information to be exchanged between a producer and a consumer allowing the communication to be placed on hold and to be resumed seamlessly. A method includes inserting gaskets and channel repeaters connected to interfaces of multiple intellectual property (IP) blocks in order to replace traditional links with Chronos Links; performing simplified floorplanning; performing simplified placement; performing simplified clock tree synthesis (CTS) and routing; and performing simplified timing closure.

17 Claims, 16 Drawing Sheets

Related U.S. Application Data

62/250,998, filed on Nov. 4, 2015, provisional application No. 62/372,217, filed on Aug. 8, 2016.

(56) References Cited

U.S. PATENT DOCUMENTS

| | | | |
|---|---|---|---|
| 6,801,329 B1 * | 10/2004 | Urabe | H04N 1/0083 358/1.13 |
| 8,365,113 B1 | 1/2013 | Bhardwaj et al. | |
| 9,685,953 B1 | 6/2017 | Sadowski | |
| 9,921,992 B2 | 3/2018 | Hilgemberg Pontes et al. | |
| 9,977,852 B2 | 5/2018 | Giaconi et al. | |
| 9,977,853 B2 | 5/2018 | Giaconi et al. | |
| 10,235,488 B2 | 3/2019 | Giaconi et al. | |
| 10,467,369 B2 * | 11/2019 | Giaconi | G06F 13/42 |
| 2002/0105745 A1 | 8/2002 | Kim | |
| 2003/0035496 A1 | 2/2003 | Noda | |
| 2004/0131062 A1 | 7/2004 | Horie | |
| 2004/0151209 A1 | 8/2004 | Cummings et al. | |
| 2005/0180514 A1 | 8/2005 | Choi et al. | |
| 2005/0200388 A1 | 9/2005 | Har et al. | |
| 2006/0007236 A1 | 1/2006 | Takagi et al. | |
| 2008/0285743 A1 | 11/2008 | Yokota et al. | |
| 2008/0304430 A1 | 12/2008 | Zhuyan | |
| 2009/0106719 A1 | 4/2009 | Stevens | |
| 2009/0268760 A1 | 10/2009 | Smyers | |
| 2009/0285341 A1 | 11/2009 | Pukkila et al. | |
| 2010/0042573 A1 | 2/2010 | Wenig et al. | |
| 2010/0127742 A1 | 5/2010 | Chen | |
| 2010/0285743 A1 | 11/2010 | Li et al. | |
| 2011/0058569 A1 | 3/2011 | Harrand | |
| 2013/0259146 A1 | 10/2013 | Mangano et al. | |
| 2014/0064096 A1 | 3/2014 | Stevens et al. | |
| 2014/0204764 A1 | 7/2014 | Kumar | |
| 2014/0240326 A1 | 8/2014 | Cutter et al. | |
| 2014/0376557 A1 | 12/2014 | Park et al. | |
| 2015/0120978 A1 | 4/2015 | Kalyanasundharam et al. | |
| 2015/0121324 A1 | 4/2015 | Thonnart et al. | |
| 2016/0006658 A1 | 1/2016 | Averi et al. | |
| 2016/0034409 A1 | 2/2016 | Kim et al. | |
| 2016/0188522 A1 | 6/2016 | Hilgemberg Pontes et al. | |
| 2016/0344629 A1 | 11/2016 | Gray | |
| 2017/0091130 A1 | 3/2017 | Matsunaga | |
| 2017/0126425 A1 | 5/2017 | Giaconi et al. | |
| 2017/0180800 A1 | 6/2017 | Mayrand | |
| 2017/0289057 A1 | 10/2017 | Jiang et al. | |
| 2017/0293586 A1 | 10/2017 | Yan et al. | |
| 2017/0308721 A1 | 10/2017 | Pedersen | |
| 2018/0097720 A1 | 4/2018 | Jaffer et al. | |
| 2018/0109415 A1 | 4/2018 | Han et al. | |
| 2018/0227015 A1 | 8/2018 | McCormack et al. | |
| 2019/0213296 A1 | 7/2019 | Lin et al. | |

\* cited by examiner

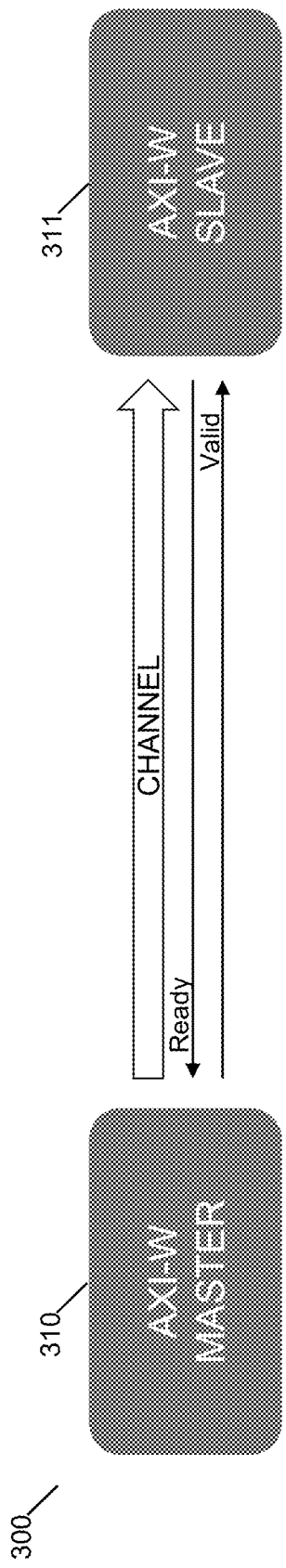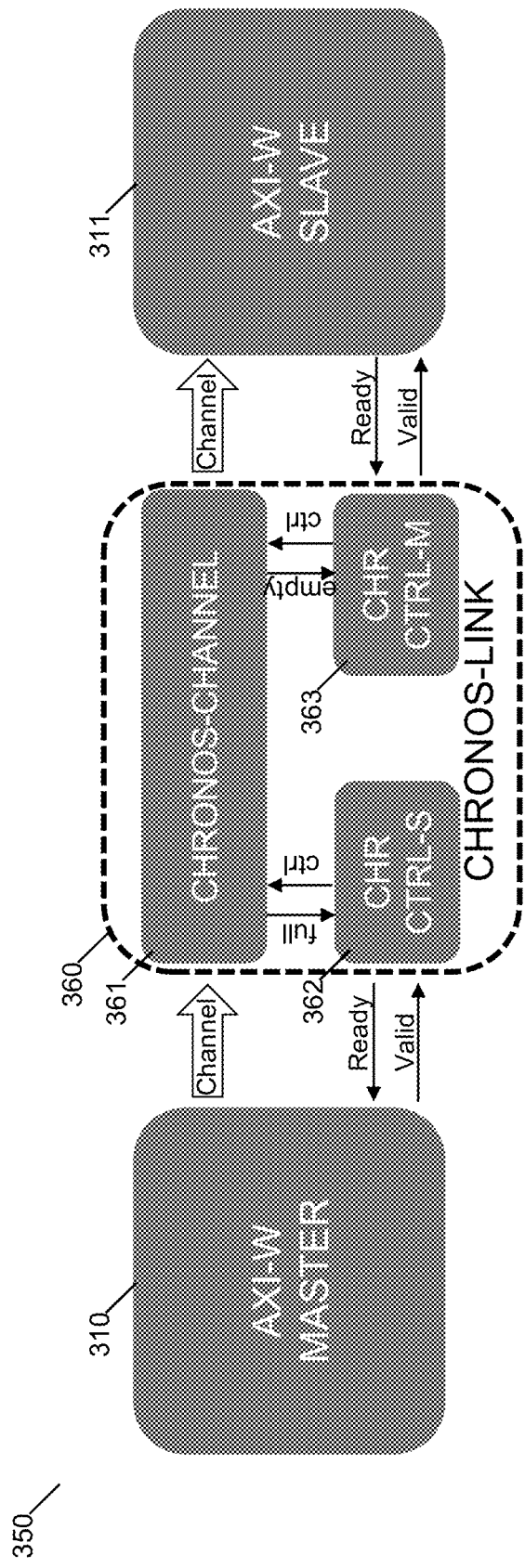

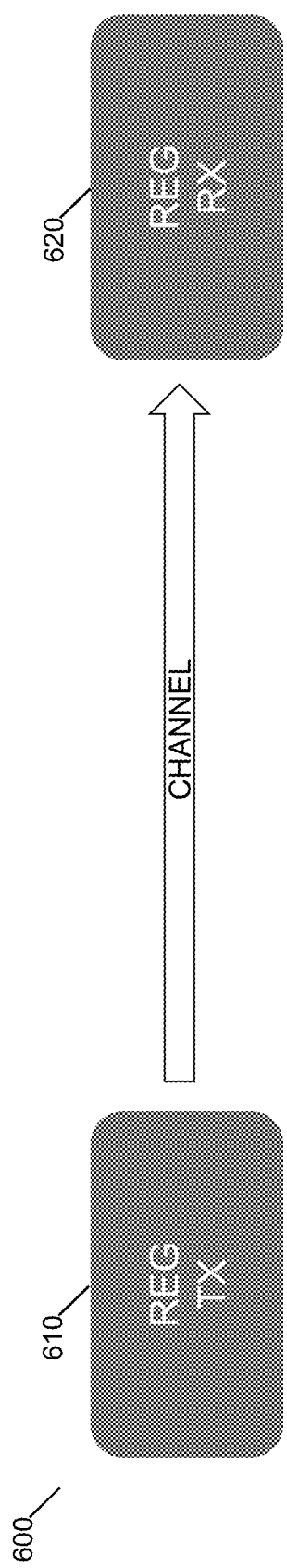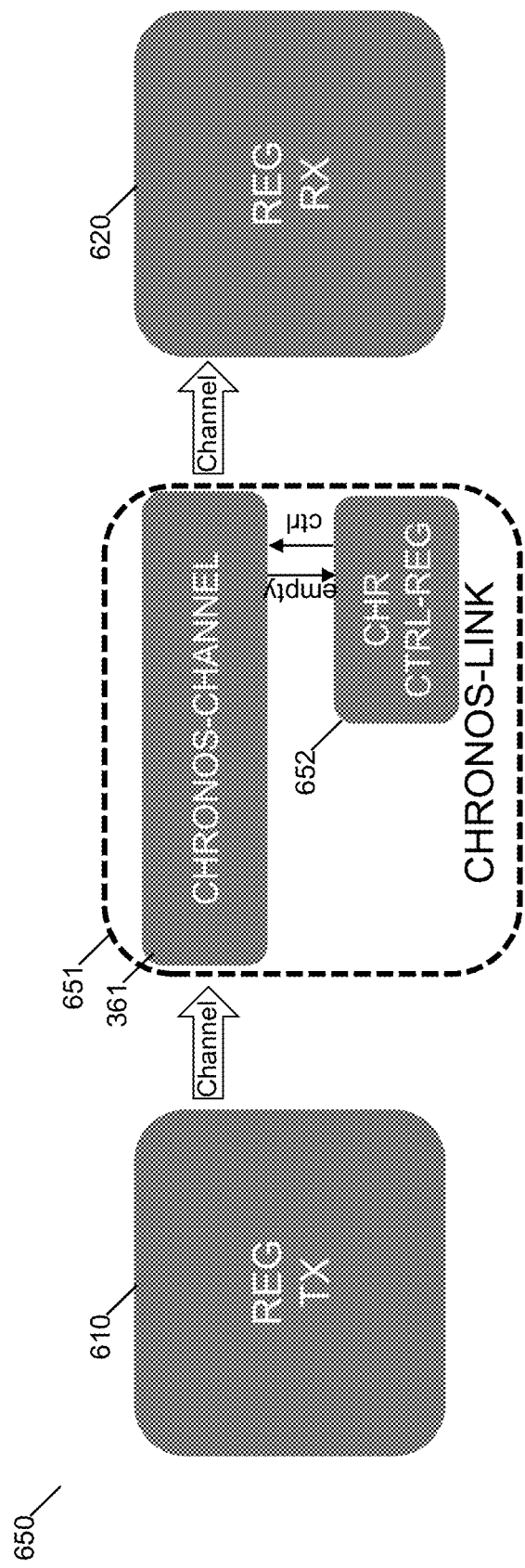

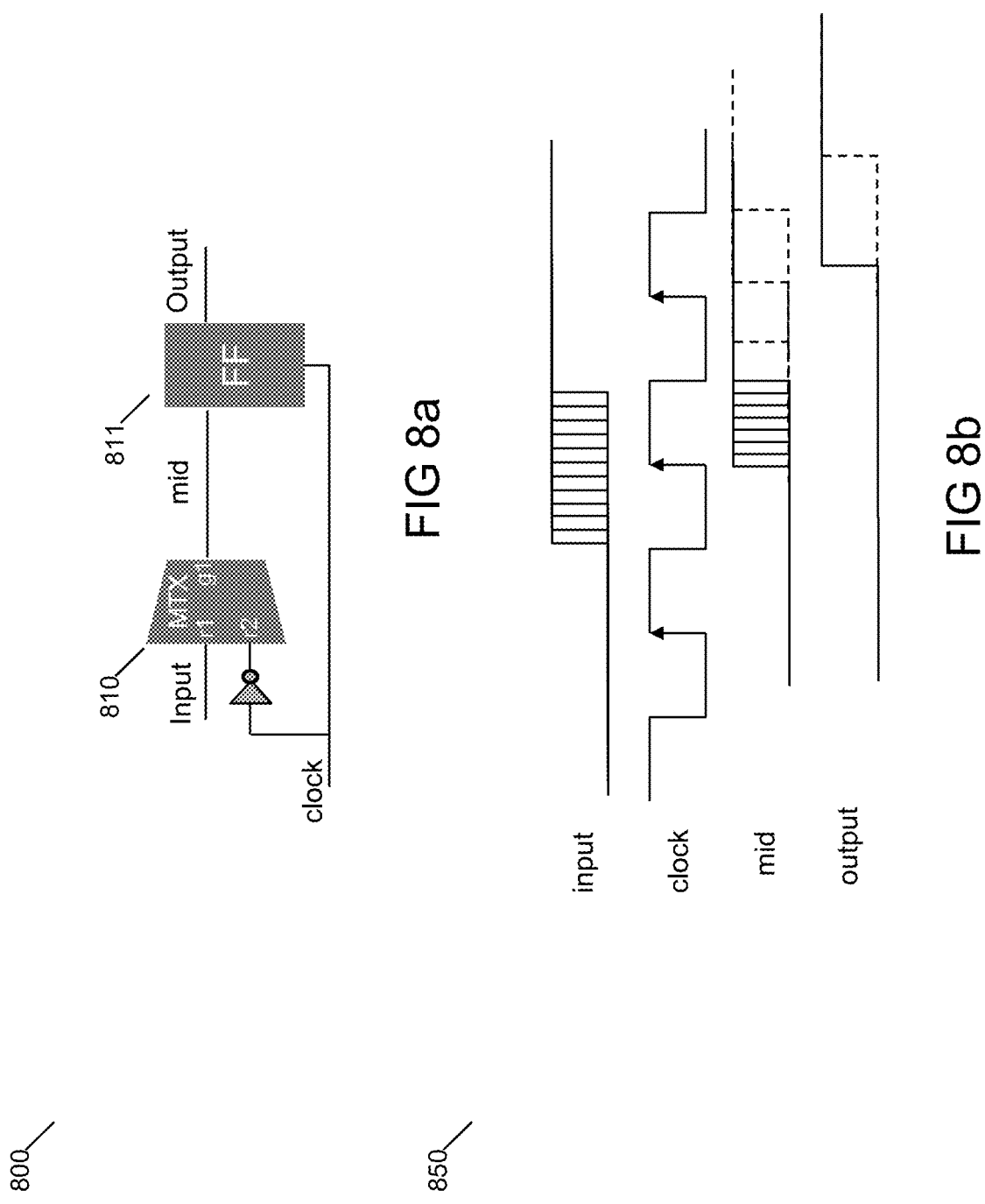

APPLICATION SPECIFIC INTEGRATED CIRCUIT LINK

RELATED APPLICATION INFORMATION

This present application is a continuation of U.S. patent application Ser. No. 15/876,059, entitled "Application specific integrated circuit link", filed on Jan. 19, 2018, which in turn is a continuation of U.S. patent application Ser. No. 15/344,420, filed on Nov. 4, 2016, which issued as U.S. Pat. No. 9,977,853 on May 22, 2018, which claims the benefit of priority under 35 U.S.C. 119(e) to Provisional Patent Application Ser. No. 62/372,221, entitled "Application Specific Integrated Circuit Point-To-Multi-Point Interconnect," filed Aug. 8, 2016 and claims the benefit of priority under 35 U.S.C. 119(e) to Provisional Patent Application Ser. No. 62/251,000, entitled "Application Specific Integrated Circuit Point-To-Multi-Point Interconnect," filed Nov. 4, 2015, and claims the benefit of priority under 35 U.S.C. 119(e) to Provisional Patent Application Ser. No. 62/372,217, entitled "Application Specific Integrated Circuit Point-to-Point Interconnect," filed Aug. 8, 2016 and claims the benefit of priority under 35 U.S.C. 119(e) to Provisional Patent Application Ser. No. 62/250,998, entitled "Application Specific Integrated Circuit Point-to-Point Interconnect," filed Nov. 4, 2015, all of which are incorporated herein by reference as if set forth in full.

BACKGROUND

1. Technical Field

The various embodiments described herein are related to application specific integrated circuits (ASICs), and more particularly to the design of various ASICs.

2. Related Art

Continuing advances in semiconductor device fabrication technology have yielded a steady decline in the size of process nodes. For example, 22 nanometer (nm) process nodes were introduced in 2012 but were quickly succeeded by 14 nm fin field-effect transistors (FinFETs) in 2014 while 5 nm process nodes are projected for 2020.

The decrease in process node size allows a growing number of intellectual property (IP) cores or IP blocks to be placed on a single ASIC chip. That is, modern ASIC designs often spread numerous process nodes across a comparatively large silicon die, and include combinations of IP blocks and logic functions. At the same time, modern technology also requires increased connectivity and large data transfers between various IP blocks. In addition, modern ASIC chips frequently include multiple clock domains in order to leverage multi-core implementations. Thus, one or more clock signals may need to be distributed across the chip in a manner that minimizes clock skew. For instance, the edge of the clock signal received at a logic block located near a clock source should be aligned with those received at more distant logic blocks. To simplify data exchange among heterogeneous IPs, data is exchanged using a shared communication protocol (i.e. AMBA-AXI) which make use of Master and Slave interfaces.

Conventionally, a balanced clock signal distribution (i.e., timing closure) is achieved by inserting buffers. For example, pursuant to a traditional ASIC design flow, after floor planning and placing various IP blocks, a clock tree (i.e., a clock distribution network) may be synthesized and buffers may be added along the signal path from a clock source to various IP blocks according to the clock tree. In fact, timing closure for a clock signal that is distributed over a large and complex ASIC design typically requires the strategic placement of numerous buffers. Moreover, the distribution of a clock signal is also highly susceptible to both systematic and random variations. In particular, proper timing closure must account for the effects of on-chip variations that arise as a result of different process, voltage, and temperature (PVTs) and operation modes, which would otherwise introduce additional clock skews. As such, the most laborious and time consuming aspect of conventional ASIC design tends to be clock alignment. Clock tree synthesis and timing closure generally require significant manual intervention. In addition, the mechanisms (i.e., buffers) used to balance the clock across an ASIC chip generally consume a majority of the power in any conventional ASIC design. If the distance between to IPs is too long for guaranteeing timing closure, one or more Protocol Pipeline Stage (i.e. AMBA Register Slice) is inserted between them to relax timing between the two IP ports, complicating even more top level clock routing and balancing, and significantly increasing the used area.

Therefore, what is needed are an apparatus and method that overcome these significant problems found in the aforementioned conventional approach to modern ASIC design.

SUMMARY

Apparatuses and methods for ASIC interconnect design are provided.

A Chronos Link is an ASIC on-chip and off-chip interconnect communication protocol that allows two IP blocks to transmit and receive information. The Chronos Link protocol may utilize messages or signals to indicate the availability and/or readiness of information to be exchanged between a producer device and a consumer device allowing the communication to be placed on hold and to be resumed seamlessly. The Chronos Link stands out by relying on a reduced set of timing assumptions and is robustness against delay variations. To do so, the Chronos Link transmits data using delay insensitive (DI) codes and quasi-delay-insensitive (QDI) logic, making the communication insensitive to all wire and gate delay variations. Also, a unique characteristic of a Chronos Link, when compared to related solutions, is the fact that the Chronos Link uses temporal compression in its internal paths to reduce the overheads of QDI logic and efficiently transmit data. In fact, data can be compressed by different ratios, which can be any rational number (as long as a technology specific maximum frequency restriction is respected). Chronos Link protocol agnostic capability allows for direct replacement of many commonly used ASIC communication protocol such as AMBA AXI, CoreConnect, IPBus, OCP, Hyper Transport, Quick Path, etc. or it can be tailored to a fully custom implementation.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which:

FIG. 3A details the AMBA AXI Write channel and its control signals;

FIG. 3B illustrates an exemplary implementation of the AMBA AXI Write channel with Chronos Link (a combination of a Chronos Channel plus a Chronos Controller Slave and a Chronos Controller Master) according to various embodiments;

FIG. 6A illustrates an exemplary implementation of a standard register to register interface;

FIG. 6B illustrates an exemplary implementation of a register interface with Chronos Link (a combination of a Chronos Channel plus a Chronos Register Controller) according to various embodiments;

FIG. 8A illustrates an exemplary embodiment of a synchronizer;

FIG. 8B illustrates exemplary Mutex waveforms;

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Figure 1:
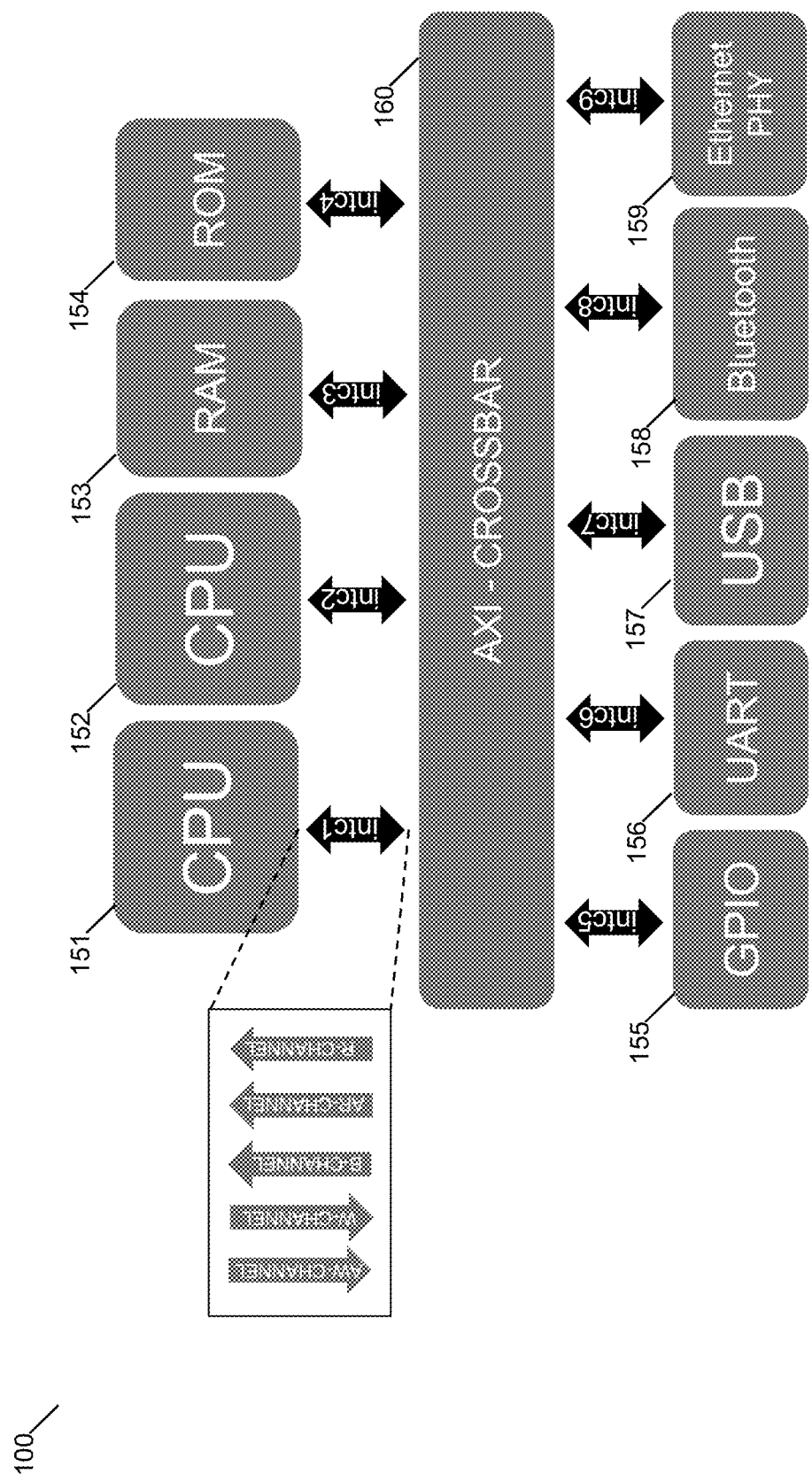
FIG. 1 is a top level block diagram of a generic ASIC design.

FIG. 1 is a chart illustrating an example of top level block diagram 100 for a generic ASIC design. The diagram of FIG. 1 shows data communication between various IP blocks including, for example, but not limited to, Two Central Processing Units (CPU) blocks 151, and 152, a Random Access Memory (RAM) block 153, a Read Only Memory (ROM) block 154, a General Purpose IO (GPIO) block 155, a Universal Asynchronous Receiver-Transmitter (UART) block 156, a Universal Serial Bus (USB) block 157, a Bluetooth block 158, an Ethernet PHY block 159 and an AXI Crossbar block 160; through a specific protocol bus interconnect (i. e. AMBA-AXI interconnect with its 5 communication channels). In this diagram each IP has one or more Master or Slave bus interconnect ports to perform the data communication tasks.

Figure 2:
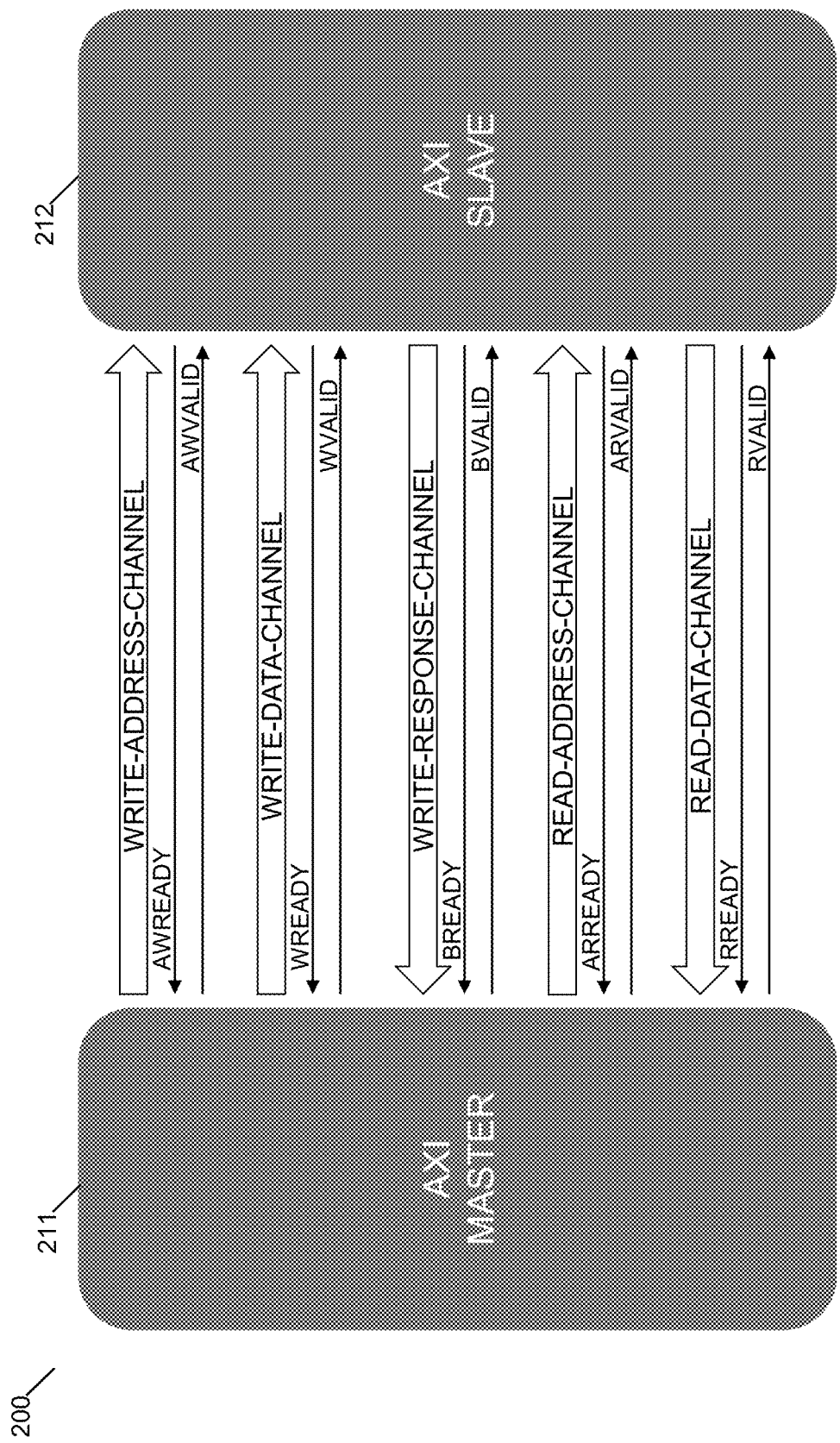
FIG. 2 illustrates a generic Advanced Microcontroller Bus Architecture (AMBA) with Advanced eXtensible Interface (AXI), known as AMBA-AXI, (composed of 5 AMBA-AXI Channels: Address Write (AW), Write (W), Write Response (B), Address Read (AR) and Read (R))

FIG. 2 shows the detail of a AMBA-AXI interconnect between a Master (block 211) and a Slave (block 212) port. In the diagram of FIG. 2 the five independent channels (Write-Address (AW-CHANNEL in FIG. 1), Write-Data (W-CHANNEL in FIG. 1), Write-Response (B-CHANNEL in FIG. 1), Read-Address (AR-CHANNEL in FIG. 1), and Read-Data (R-CHANNEL in FIG. 1)) with their payloads and control signals (e.g., AWREADY and AWVALID, for example as shown in FIG. 2) can be seen.

FIG. 3A illustrates details for one AMBA-AXI channel (Write-Data) where a Master port (310) transfers data to a Slave Port (311). FIG. 3B illustrates an exemplary implementation of a Chronos Link (360) to perform the same data exchange as the AMBA-AXI channel of FIG. 1 between the Master port (310) and the Slave port (311).

Figure 10A:
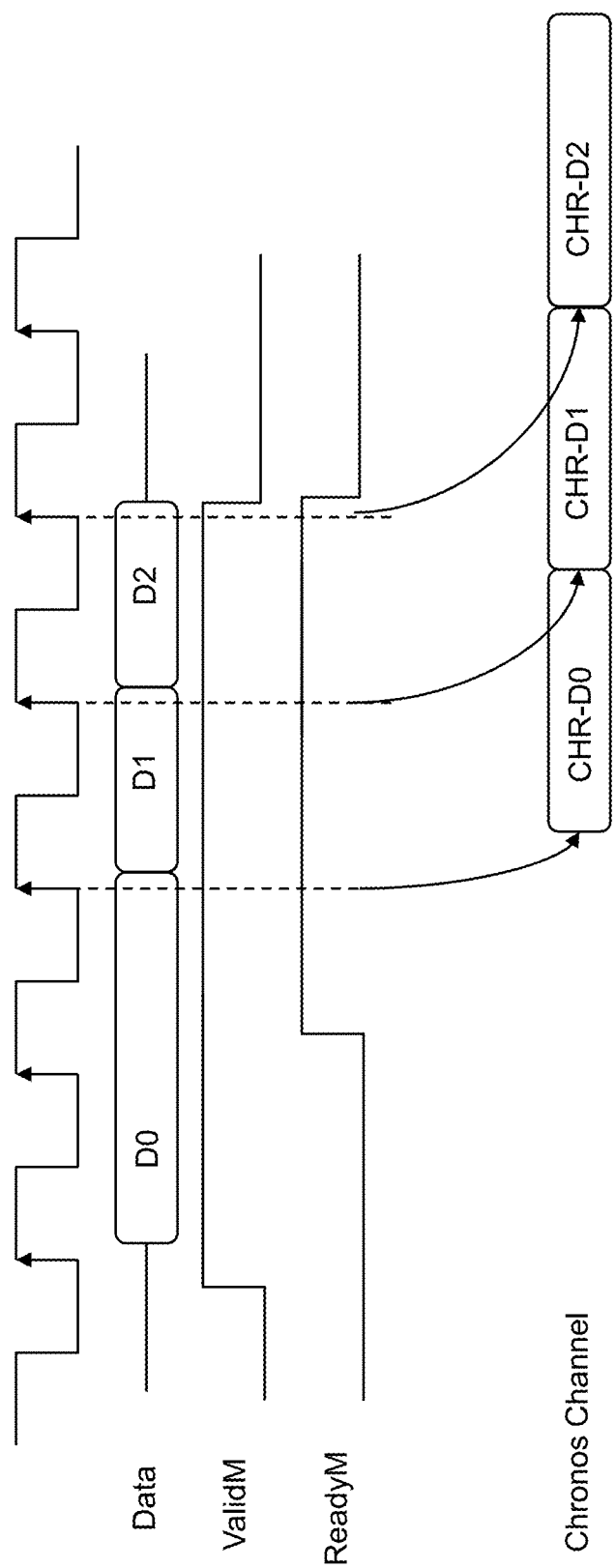
FIG. 10A shows an exemplary embodiment of an AXI producer channel handshake protocol in which two auxiliary signals (ValidM and ReadyM), are used to implement the handshake protocol.

FIG. 10A shows an exemplary embodiment of an AXI producer channel handshake protocol in which two auxiliary signals (ValidM and ReadyM), are used to implement the handshake protocol. The ValidM signal generated by the producer indicates validity of the data, while the ReadyM signal received by the producer indicates the readiness of the consumer to accept new data. Only when both signals are asserted can the data be successfully transferred into the channel. In a Chronos-Link, the data is compressed and converted in a delay insensitive code. In one embodiment, a Chronos Slave Controller generates the ReadyM signal and transmits it to the producer based on receiving a Full signal from the Chronos Channel.

Figure 10B:
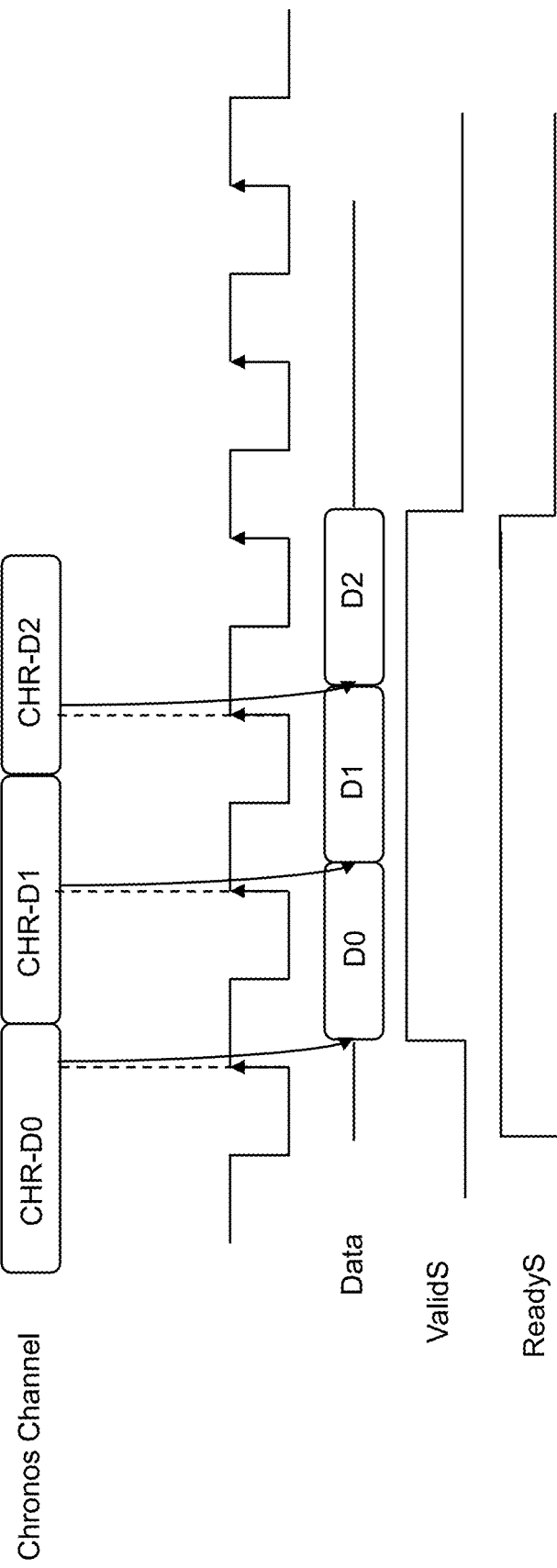
FIG. 10B shows an exemplary embodiment of an AXI consumer channel handshake protocol in which two auxiliary signals (ValidS and ReadyS), are used to implement the handshake protocol.

FIG. 10B shows an exemplary embodiment of an AXI consumer channel handshake protocol in which two auxiliary signals (ValidS and ReadyS), are used to implement the handshake protocol. The ValidS signal received by the consumer indicates validity of the data, while the ReadyS signal generated by the consumer indicates the readiness of the consumer to accept new data. Only when both signals are asserted can the data be successfully extracted from the channel. In a Chronos-Link, the data coming from the Chronos Channel is de-compressed and converted back to its original format. In one embodiment, a Chronos Master Controller, takes care of generating the ValidS signal and transmitting it to the consumer based on receiving an Empty signal from the Chronos Channel.

A Chronos Link is an ASIC on-chip and off-chip interconnect communication protocol that allows two IP blocks to transmit and receive information. The Chronos Link protocol may utilize messages or signals to indicate the availability and/or readiness of information to be exchanged between a producer device and a consumer device allowing the communication to be placed on hold and to be resumed seamlessly. The Chronos Link stands out by relying on a reduced set of timing assumptions and is robustness against delay variations. To do so, the Chronos Link transmits data using delay insensitive (DI) codes and quasi-delay-insensitive (QDI) logic, making the communication insensitive to all wire and gate delay variations. Also, a unique characteristic of a Chronos Link, when compared to related solutions, is the fact that the Chronos Link uses temporal compression in its internal paths to reduce the overheads of QDI logic and efficiently transmit data. In fact, data can be compressed by different ratios, which can be any rational number (as long as a technology specific maximum frequency restriction is respected). Chronos Link protocol agnostic capability allows for direct replacement of many commonly used ASIC communication protocol such as AMBA AXI, CoreConnect, IPBus, OCP, Hyper Transport, Quick Path, etc. or it can be tailored to a fully custom implementation.

In one embodiment a Chronos Link (360) is composed of a Chronos Channel (361) fully disclosed in a separate utility patent application (U.S. patent application Ser. No. 15/344,416) plus a Chronos Slave Controller (362), communicating directly to the original Master Port 310 and a Chronos Master Controller (363) to connect to the original Slave Port 311. A Chronos Link brings all the advantage of Chronos Channels to a communication protocol, allowing independent clock references for Master and Slave IPs, PVT tolerance, simplified floorplan, enhanced yield, and data time compression (with potential for minimize routing).

Figure 4A:
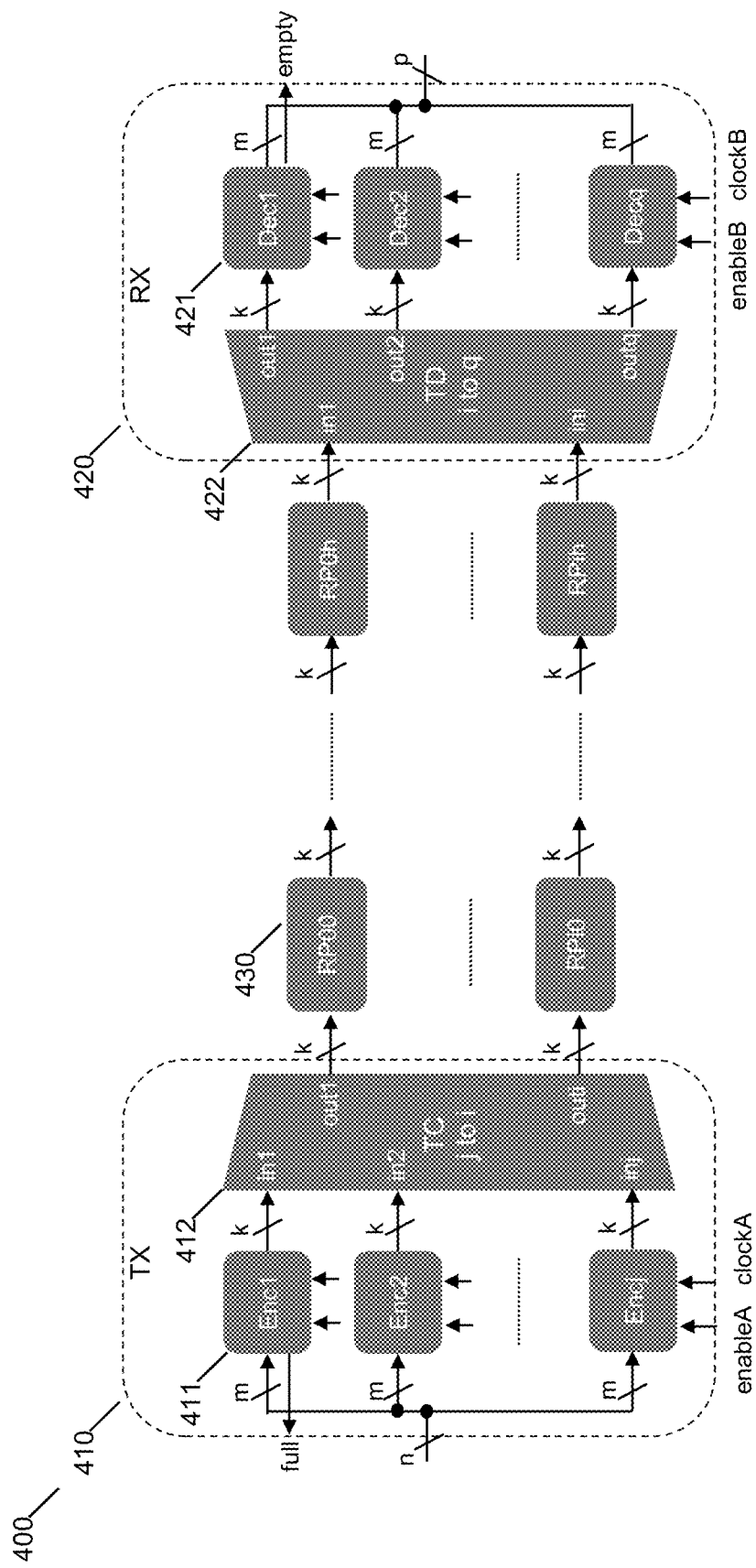
FIG. 4A is a block diagram illustrating an exemplary embodiment of a generic Chronos Channel implementation.

FIG. 4A is a block diagram illustrating an exemplary embodiment of a generic Chronos Channel 400 according to various embodiments. A Chronos Channel is an ASIC Interconnect that allows transmitter blocks to send data to receiver blocks. It stands out by relying on a reduced set of timing assumptions and is robust against delay variations. To do so, Chronos Channels transmit data using delay insensitive (DI) codes and quasi-delay-insensitive (QDI) logic. In this way, Chronos Channels are insensitive to all wire and gate delay variations, but for those belonging to a few specific forking logic paths called isochronic forks. Also, a unique characteristic of a Chronos Channel, when compared to related solutions, is the fact that it uses temporal compression in its internal paths to reduce overheads of QDI logic and efficiently transmit data. In fact, data can be compressed by different ratios, which can be any rational number (as long as a technology specific maximum frequency restriction is respected). In this way, a Chronos Channel is defined by the combination of a DI code (and related handshake protocol), a temporal compression ratio and the hardware required to encode, decode, compress, decompress and transmit data.

DI codes are a specific family of encoding schemes where no codeword can be contained in another codeword. This allows a receiver to perceive the transmission of a codeword unambiguously. Such a characteristic eliminates the need for a control signal that identifies the validity of a data channel, and its respective timing assumptions (as in synchronous or bundled-data asynchronous design), as the validity of the data channel is encoded in the data itself. Also, note that, usually, DI codes are employed in digital applications, which means that their code words are typically defined using a set of binary values. However, in a Chronos Channel, signals do not need to be digital and codewords can be represented using sets with more than 2 values, provided that data is still encoded using a DI code. In other words, the data in a Chronos Channel can be composed of analog signals, as long as no codeword is contained in another codeword. Such characteristic allows a more flexible usage of Chronos Channels. Another aspect of DI codes is that, to allow data transmission, they are usually coupled to a handshake protocol, which is usually 4- or 2-phases.

Referring to FIG. 4A, in various embodiments, a Chronos Channel may serve as a connection 400 between a n-bit wide data bus running at a frequency determined by a clockA frequency and a second p-bit wide data bus running at a frequency determined by a clockB frequency. According to one exemplary embodiment, the connection 400 may include a transmitter 410 (i.e., a synchronous to asynchronous gasket) and a receiver 420 (i.e., an asynchronous to synchronous gasket). In various embodiments, data "n" from a first block (not shown) and a clock signal "clockA" may enter the transmitter 410 and the output (i.e., asynchronous data) from the transmitter 410 may travel through a timing independent channel composed of a "i+1" rows of "h+1"-number of parallel repeaters 430. The asynchronous data from the transmitter 410 is then input into the receiver 420 that is associated with the second block (not shown). The output of the receiver 420 includes data "p" that is input into the second block. The transmitter 410 also produces an asynchronous signal (labeled "full") to indicate when the pipeline is full. The Receiver 420 also produces an asynchronous signal (labeled "empty") to indicate when the pipeline is empty. Advantageously, the timing independent channel composed of the repeaters 430 is self-regulating and process independent. As such, in various embodiments, the timing independent channel between the first block and the second block may be established by a handshake procedure without any need to perform complex timing closure.

In some embodiments, the timing independent channel between the transmitter 410 and the receiver 420 may include one or more repeaters 430. The repeaters 430 may improve signal strength and throughput in the asynchronous pipeline between the transmitter 410 and the receiver 420. Alternately, the transmitter 410 and the receiver 420 may have a direct connection, i.e., without any repeaters 430. The transmitter 410 also includes "j" encoders (Enc) 411; a "j/i" temporal compressor (TC) 412. The receiver 420 includes a "i/q" temporal decompressor (TD) 422, and "q" decoders (Dec) 421.

Figure 4B:
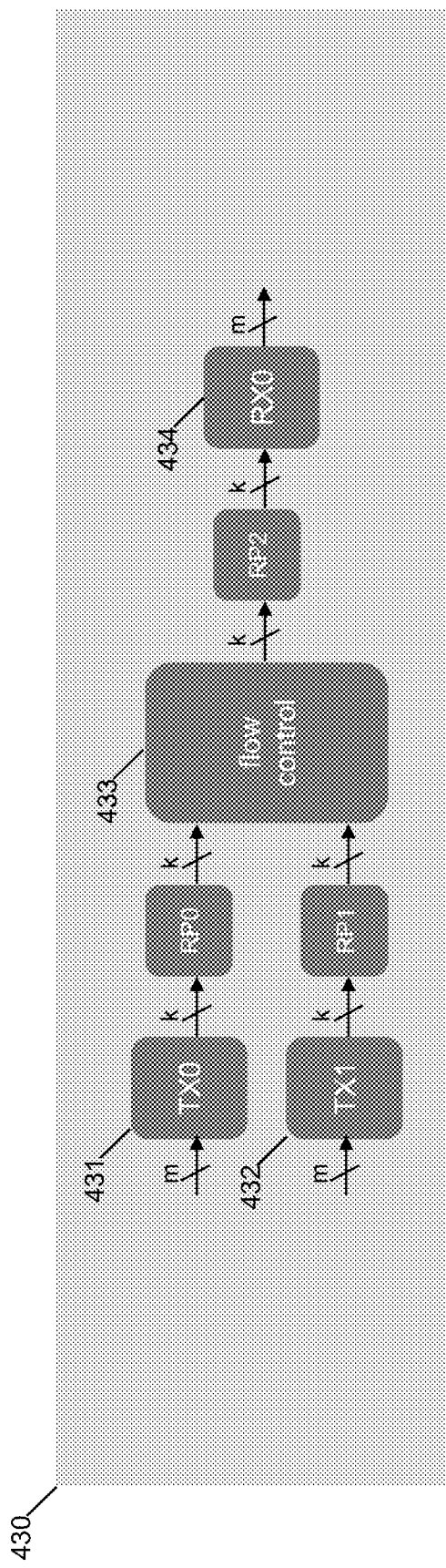
FIG. 4B shows an exemplary Chronos Channel using Join or Merge blocks.

FIG. 4B shows a block diagram of an exemplary Chronos Channel using Join or Merge blocks in a multi-point-to-point connection 430 according to various embodiments. Referring to FIG. 4B, in various embodiments, a multi-point-to-point connection 430 may serve as a connection between two producer IP blocks and a third consumer IP block. The producer IPs are connected to respective inputs of TXs 431 and 432 (and subsequently to inputs of two repeaters RP0 and RP1 in this example), thereby generating two independent paths in the Chronos Channel. These paths can then be combined using a flow control block 433, which can be (but are not limited to) a merge, a join or a select component, depending of the control flow requirements. For example, a merge component combines the information of both paths into a single output path, while a select or a join component can arbitrate between paths using some control mechanism. The output of the control flow block 433 will be propagated to the inputs of an RX block 434 via a third repeater RP2 in this example. Note that repeaters RP0, RP1 and RP2 can be added in any point between TXs 431 and 432 and RX 434, including before and after the flow control block 433.

Figure 4C:
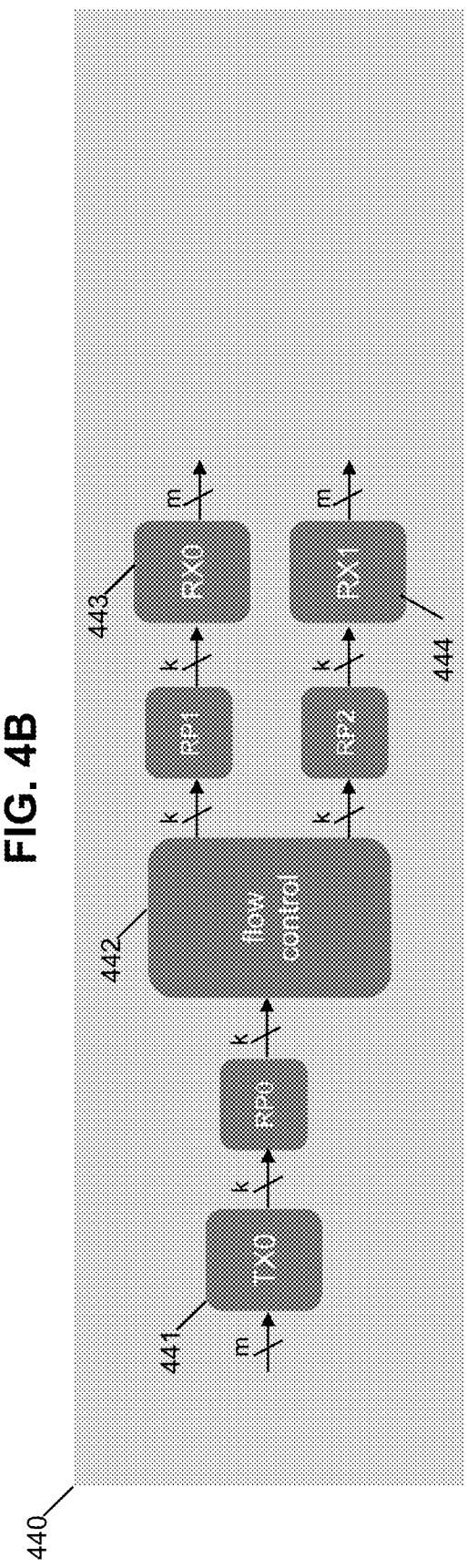
FIG. 4C shows an exemplary Chronos Channel using Fork or Steer blocks.

FIG. 4C shows a block diagram of an exemplary Chronos Channel using Fork or Steer blocks in a point-to-multi-point connection 440 according to various embodiments. Referring to FIG. 4C, in various embodiments, the point-to-multi-point connection 440 may serve as a connection between a producer IP block and two consumer IP blocks. The producer IP is connected to an input of TX 441 (and a repeater RP0 in this example) and the generated path in the Chronos Channel can be divided using a flow control block 442, which can be (but is not limited to) a fork or a steer component, depending on the flow control requirements. For example, a fork component sends the same input information to both output paths, while a steer component can arbitrate to send different input information to each of the output paths using some control mechanism. The outputs of the control flow block 442 are propagated to inputs of RX blocks 443 and 444. Note that repeaters RP0, RP1 and RP2 can be added in any point between the TX 441 and the RXs 443 and 444, including before and after the flow control block 442.

Figure 4D:
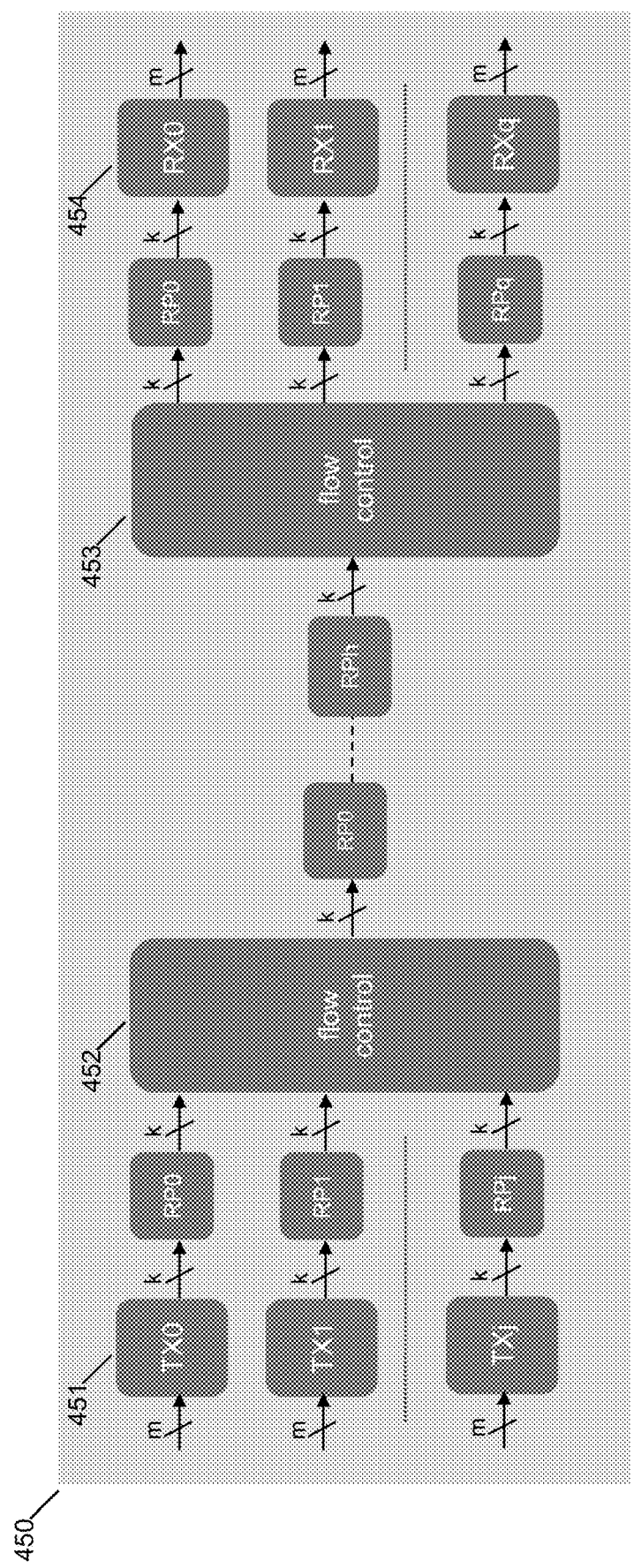
FIG. 4D shows an exemplary Chronos Channel using Join, Merge, Fork and Steer blocks.

FIG. 4D shows a block diagram of an exemplary Chronos Channel using Join, Merge, Fork and Steer blocks illustrating a multi-point-to-multi-point connection 450 according to various embodiments. Referring to FIG. 4D, in various embodiments, the multi-point-to-multi-point connection 450 may serve as a connection between a set of producer IP blocks and a set of consumer IP blocks. Each producer IP block is connected to one of j TXs 451 (TX0, TX1 to TXj), each which generates an independent path in the Chronos Channel. These independent paths can then be combined using different combinations of TX-side flow control blocks 452 and any number of repeaters (RP0 to RPh) to implement a specific functionality. The combined paths are received at a RX-side set of flow control blocks 453 and forwarded via repeaters (RP0, RP1 to RPq in this example) to q RXs 454 (RX0, RX1 to RXq). In the end of each path in the Chronos Channel, the RXs 454 are interfaced with the consumer IPs. Note that between the TXs 452 and the RXs 454 (RX0, RX1 to RXq), different combinations of flow control blocks 452 and 453 and repeaters can be employed, to fulfil functional and performance requirements.

Any of the Chronos Channel connections 400, 420, 430 and 450 may be used as the Chronos Channel 361 described above in reference to FIG. 3B.

Figure 5A:
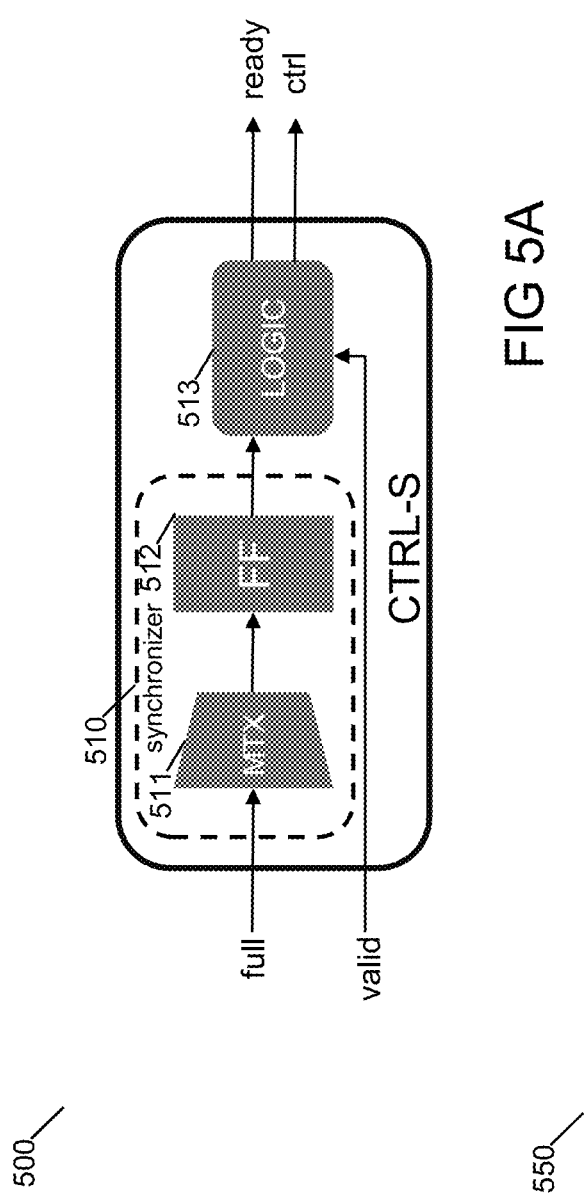
FIG. 5A illustrates an exemplary embodiment of the Chronos Slave Controller.

FIG. 5A is a block diagram illustrating a Chronos Slave Controller 500 according to various embodiments. The Chronos Slave Controller 500 may be used in various embodiments as the Chronos Slave Controller 362 described above in reference to FIG. 3B. The most important element in the controller 500 is the synchronizer 510 which is responsible for the synchronization of the asynchronous signals coming from the Chronos Channel 361 (FIG. 3B) in asynchronous domain (in particular full) to the synchronous domain. Depending on Medium Time Between Failures (MTBF) requirement the physical implementation of the synchronizer can change. An exemplary embodiment of the circuit is represented in FIG. 5A 510 composed of a Mutex (511) followed by a Flip-Flop (512). Other embodiments can be implemented such as replacing the Mutex with a second Flip-Flop, or a composition of a "n" number of alternating latches, and or combinations of the above elements, trading latency performance for MTBF performance. As can be seen in FIG. 3B, the addition of the Chronos Slave Controller 500 as the Chronos Slave Controller 362 allows a Master Interface 310 to properly interact with the Chronos Channel 361 as if it was communicating with a standard synchronous Slave Interface.

Figure 5B:
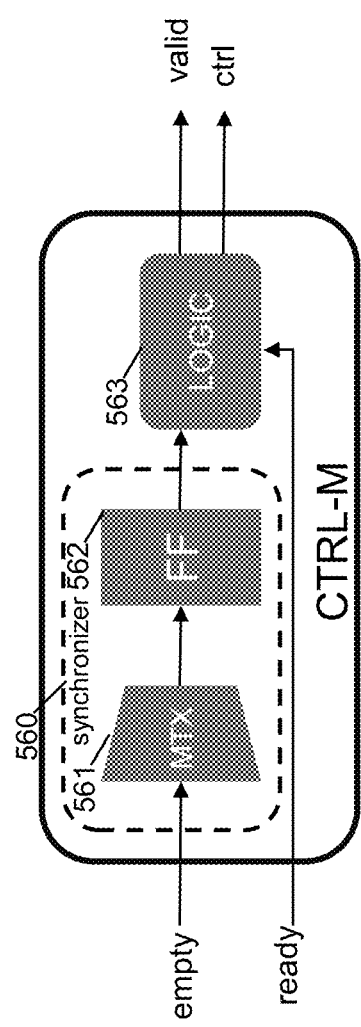
FIG. 5B illustrates an exemplary embodiment of the Chronos Master Controller.

FIG. 5B is a block diagram illustrating a Chronos Master Controller 550 according to various embodiments. The Chronos Master Controller 550 may be used in various embodiments as the Chronos Slave Controller 363 described above in reference to FIG. 3B. The most important element in the controller 550 is a synchronizer 560 which is responsible for the synchronization of the asynchronous signals coming from the Chronos Channel 361 in asynchronous domain (in particular empty) to the synchronous domain. Depending on Medium Time Between Failures (MTBF) requirement the physical implementation of the synchronizer can change. An exemplary embodiment of a synchronizer circuit 560 is represented in FIG. 5B. The synchronizer circuit 560 comprises a Mutex (561) followed by a Flip-Flop (562). Other embodiments can be implemented such as replacing the Mutex 561 with a second Flip-Flop 562, or alternatively a "n" number of alternating latches, and or combinations of the above elements, trading latency performance for MTBF performance. As can be seen in FIG. 3B, addition of the Chronos Master Controller 550 as the Chronos Master Controller 363 allows the Slave Interface 311 to properly interact with the Chronos Channel 361 as if it was communicating with a standard synchronous Master Interface.

Figure 7:
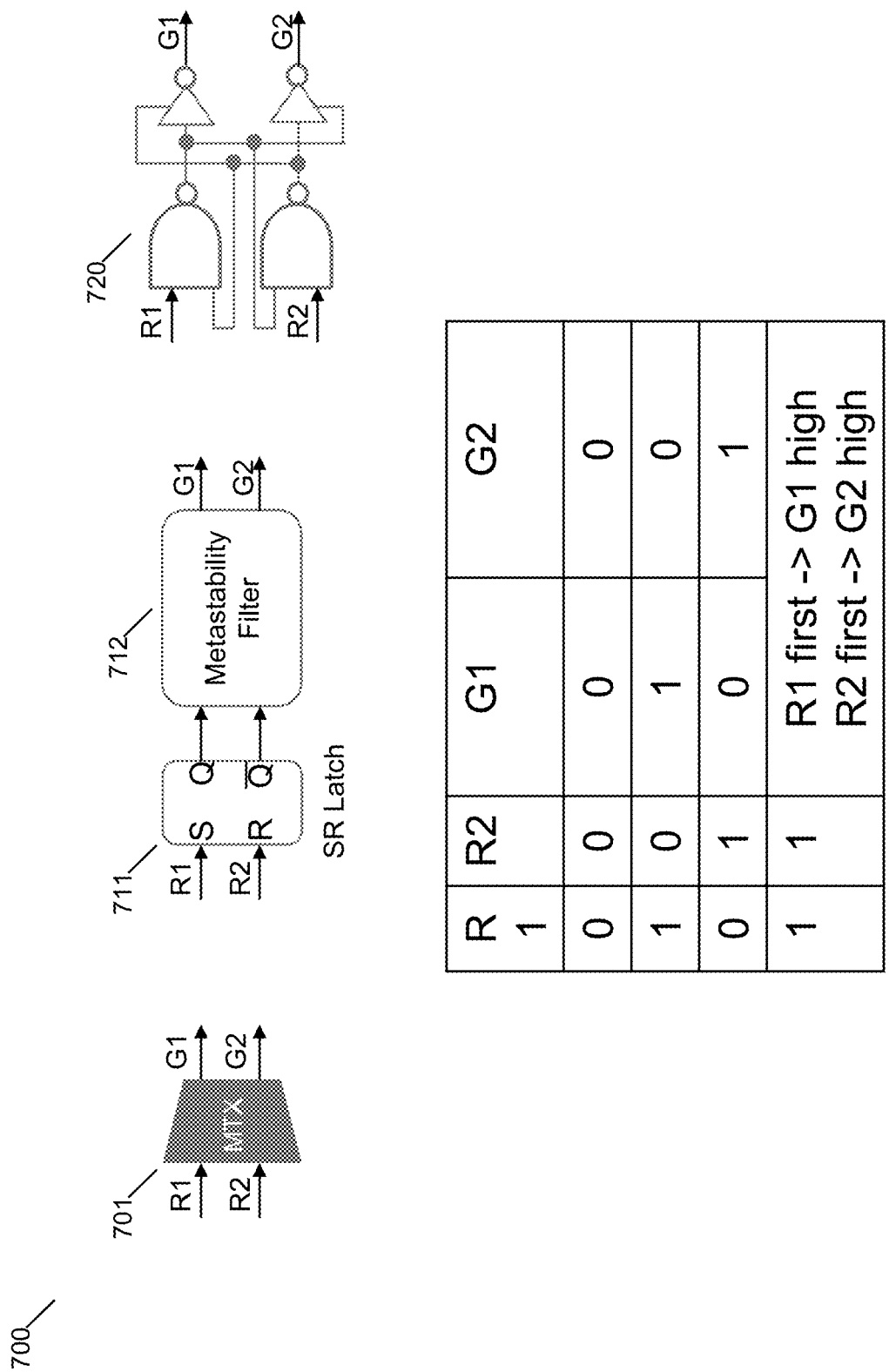
FIG. 7 illustrates an exemplary embodiment of a Mutex element.

FIG. 7 illustrates an exemplary embodiment of a block diagram of a Mutex (701). The Mutex (701) is commonly composed of two main elements: Latch (711) and Metastability Filter (712). The Mutex 701 has the characteristics of eliminating metastable levels at its output, or in other words, if either setup-time or hold-time are violated its outputs resolves to a valid logic level; the propagation delay of the outputs can be unbounded when this happens. An exemplary implementation of a Mutex is shown in 720. Only one of a G1 and G2 output can reach a "high" logic level at any one time (never both). If R1 and R2 inputs transition high in close proximity, metastability can result. The metastability filter 712 keeps both outputs (G1 and G2) at a "low" logic level until metastability resolves. Table 730 shows an example of a True table of the Mutex 701.

FIG. 8a shows an exemplary implementation of a synchronizer (800) used within a Chronos Master Controller, a Chronos Slave Controller and a Chronos Register Controller. It is composed of a Mutex (810), with a pin R2 driven by an inverted version of a clock signal, where the output (mid) of the Mutex (810) is transferred to a Flip-Flop (811). The Mutex (810) receiving the inverted clock signal at the R2 pin produces an output (mid) which guarantees at least half a clock cycle of setup time for the Flip-Flop 811. Furthermore, because of the behavior of the Mutex 810, the mid signal presented to the Flip-Flop is always level correct, reducing even further the MTBF of the synchronizer as a whole, compared to the standard 2 Flip-Flop solution. FIG. 8b shows exemplary waveforms (850) of the synchronizer described above.

Figure 9A:
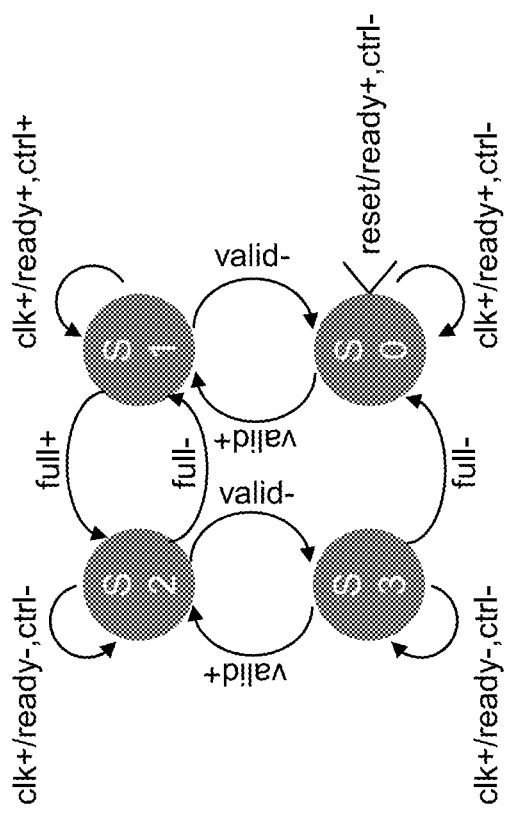
FIG. 9A illustrates an exemplary embodiment of a Chronos Slave Controller state flow diagram of a burst mode machine.

FIG. 9A illustrates an exemplary embodiment of a Chronos Slave Controller state flow diagram of a burst mode machine. FIG. 9A shows a burst mode specification of the behavior of the exemplary Chronos Slave Controller presented in FIG. 5A. As FIG. 9A shows, at reset, the circuit will set its "ready" output to 1, its "ctrl" output to 0 and enter state S0. At this state, the connected producer IP has no data for the Chronos Channel to consume and the Chronos Channel is not full. In this way, at every clock cycle ("clk" at 1), the Chronos Slave Controller can keep its outputs at reset state, to indicate to the producer IP that it is ready to receive data ("ready" at 1) and to signal to the Chronos Channel that it should not consume any data available in its inputs ("ctrl" at 0). Note that, at reset, the inputs of the controller are expected to be both 0. Also, note that every transition in the outputs of the controller happen during clock transitions ("clk" at 1) because the IP connected to it is synchronous input (and share the same clock signal of the controller) and the Chronos Channel consumes data from a synchronous bus (the output of the producer IP). Therefore, data validity of this bus is signaled by a clocked signal. From S0, the circuit will set "ctrl" to 1 and switch to state S1 if a rising edge is detected in its "valid" input, meaning that the producer IP has new data to be consumed.

At S1, the system is in a state where the producer IP has new data to be consumed and the Chronos Channel is not full. Therefore, at every rising edge of the clock signal ("clk" at 1), the controller will write 1 in both its outputs, to indicate to the producer IP that it is ready to receive data ("ready" at 1) and to signal to the Chronos Channel that it should consume the data available in its inputs ("ctrl" at 1). From S1, the controller can: (i) go back to S0 if the producer IP signals that it has no new data to be consumed ("valid" switches back to 0); (ii) switch to S2 if the Chronos Channel becomes full ("full" switches to 1); or (iii) stay at S1 if neither of the aforementioned conditions are true (in this case a burst transmission is still taking place).

At S2, the producer IP has new data to be consumed but the Chronos Channel is full and cannot receive it. Therefore, at every clock cycle ("clk" at 1), the controller will set both its outputs to 0, to indicate to the producer IP that it is not ready to receive data ("ready" at 0) and to signal to the Chronos Channel that it should not consume any data available in its inputs ("ctrl" at 0), to avoid overwriting previous data consumed by it. From S2, the controller can: (i) go back to S1 if the Chronos Channel frees space for more data (switching "full" back to 0); (ii) switch to S3 if the producer IP signals that it has no new data to be consumed ("valid" switches to 0); or (iii) stay at S2 if neither of the aforementioned conditions are true.

At S3, the producer IP has no new data and the Chronos Channel is full. Hence, at every clock cycle ("clk" at 1), the controller will set both its outputs to 0, to indicate to the producer IP that it is not ready to receive data ("ready" at 0) and to signal to the Chronos Channel that it should not consume any data available in its inputs ("ctrl" at 0), to avoid overwriting previous data consumed by it. From S2, the controller can: (i) go back to S2 if the producer IP signals that it has new data to be consumed ("valid" switches back to 1); (ii) switch to S0 if the Chronos Channel frees space for more data (switching "full" to 0); or (iii) stay at S3 if neither of the aforementioned conditions are true.

Figure 9B:
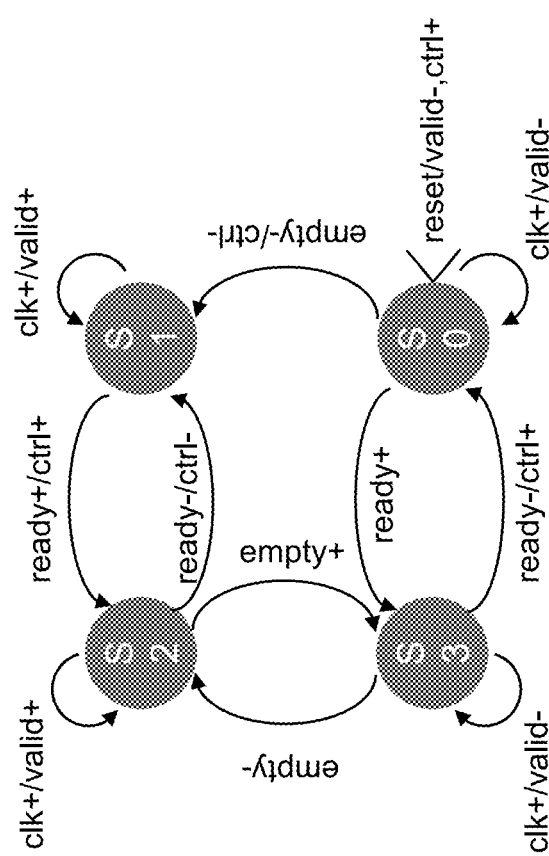
FIG. 9B illustrates an exemplary embodiment of a Chronos Master Controller state flow diagram of a burst mode machine.

FIG. 9B illustrates an exemplary embodiment of a Chronos Master Controller state flow diagram of a burst mode machine. FIG. 9B shows a burst mode specification of the behavior of the Chronos Master Controller presented in FIG. 5B. As FIG. 9B shows, at reset, the circuit will set its "valid" output to 0, its "ctrl" output to 1 and enter state S0. At this state, the connected Chronos Channel is empty and there is no data for the consumer IP to consume. At every clock cycle ("clk" at 1), the Chronos Slave Controller will keep its valid output at reset state, to indicate to the consumer IP that there is no data for it to consume ("valid" at 0). Note that, at reset, the "empty" input of the controller is expected to be at 1 and the "ready" input is expected to be at 0. Also note that every transition in the output of the controller connected to the consumer IP happen during clock transitions because the consumer IP is synchronous (and shares the same clock signal of the controller). However, transitions in the output that feed the Chronos Channel are not controlled by the clock signal because the data generated by it is asynchronous. From S0, the controller can: (i) switch to S1 if the Chronos Channel has new data to be consumed ("empty" switches to 0); (ii) switch to S3 if the consumer IP becomes ready to receive new data ("ready" switches to 1); or (iii) stay at S0 if neither of the aforementioned conditions are true.

At S1, the system is in a state where the Chronos Channel has new data to be consumed but the consumer IP cannot receive it. Therefore, at every rising edge of the clock signal ("clk" at 1), the controller will write 1 in its "valid" output, to indicate to the consumer IP that new data is available. Note that while switching from S0 to S1 or S2 to S1, the controller will switch its "ctrl" output to 0, to signal to the Chronos Channel that the data in its output was not consumed (as "ready" is at 0) and avoid it to be overwritten. The value of "ctrl" will stay at 0 until the controller switch to S1. From S1, the controller can: (i) switch to S2 if the consumer IP becomes ready to receive new data ("ready" switches to 1); or (ii) stay at S1.

At S2, the system is in a state where the Chronos Channel has new data to be consumed and the consumer IP is ready to receive it. Therefore, at every rising edge of the clock signal ("clk" at 1), the controller will write 1 in its "valid" output, to indicate to the consumer IP that new data is available. Also, while switching from S2 to S1, the controller will switch its "ctrl" output to 1, to signal to the Chronos Channel that the data in its output will be consumed in the next clock cycle (as "ready" is at 1), so that it can generate new data. Note that the value of "ctrl" will stay at 1 until the controller switch to S1. From S2, the controller can: (i) switch back to S1 if the consumer IP stops being ready to receive new data ("ready" switches to 0); (ii) switch to S3 if the Chronos Channel becomes empty and no new data is available for the consumer IP to receive ("empty" switches to 1); or (iii) stay at S2 if neither of the aforementioned conditions are true (in this case a burst is taking place).

At S3, the system is in a state where the consumer IP is ready to receive data, but the Chronos Channel has no new data in its outputs. Therefore, at every rising edge of the clock signal ("clk" at 1), the controller will write 0 in its "valid" output, to indicate to the consumer IP that there is no new data available. Note that, while switching from S0 to S3, the controller will switch its "ctrl" output to 1, to signal to the Chronos Channel that its can generate new data in its output as soon as it is ready, because the consumer IP is ready to receive (as "ready" is at 1). Note that the value of "ctrl" will stay at 1 until the controller switch to S1. From S3, the controller can: (i) switch back to S2 if the Chronos Channel becomes not empty and has new data for the consumer IP to receive ("empty" switches to 0); (ii) switch to S0 if the consumer IP stops being ready to receive new data ("ready" switches to 0); or (iii) stay at S3 if neither of the aforementioned conditions are true.

In various embodiments, sets of Chronos Links between different IP blocks allow timing independent channels to be established between IP blocks in the ASIC design 100, for example. For example, in reference to FIG. 1, a first set of five timing independent channel links may be established between the CPU block 151 and the AXI-Crossbar 160 using five different Chronos Links. In various embodiments, the first timing independent channel may be a part of a point-to-point connection between the CPU block 151 and the AXI-Crossbar 160 (labeled "intc1" in FIG. 1). Eight other sets of timing independent channel links, each containing five different Chronos Links may be established between the CPU block 152 and the AXI-Crossbar 160 (see "intc2"), the RAM block 153 and the AXI-Crossbar 160 (see "intc3"), the ROM block 154 and the AXI-Crossbar 160 (see "intc4"), the GPIO block 155 and the AXI-Crossbar 160 (see "intc5"), the UART block 156 and the AXI-Crossbar 160 (see "intc6"), the USB block 157 and the AXI-Crossbar 160 (see "intc7"), the Bluetooth block 158 and the AXI-Crossbar 160 (see "intc8"), and the Ethernet PHY block 159 and the AXI-Crossbar 160 (see "intc9"), each using five independent Chronos Links as highlighted for the "intc1" connection for the CPU block 151 in FIG. 1.

According to one exemplary embodiment, timing closure for the ASIC design 100 may be accomplished with simplified, top level checks. That is, testing each individual IP block in the ASIC design 100 across all corners (i.e., PVT corners) obviates any complex timing margin evaluation for the ASIC design 100 as a whole.

As illustrated in FIG. 3B, introduction of a Chronos Link 360 (Chronos Channel 361+Chronos Slave Controller 362+ Chronos Master Controller 363) has the unique characteristic to completely decouple the Master Interface 211 (FIG. 2) from the Slave Interface 212 (FIG. 2) in terms of both frequency and phase of operation as well as data bus width. The combination of a timing insensitive channel (e.g., a Chronos Channel) and proper handling of the communication protocol (i.e. AMBA-AXI) allows for isochronous, mesochronous, plesiochronous and asynchronous communication between the IP blocks without data corruption and/or data losses. Furthermore, the availability of linear compression within the Chronos Channel enables the possibility of connecting IP blocks even with different data width (as long as they operate on the same protocol).

Chronos link 360 includes linear compression capability that allows for easier routing in the ASIC design 100 between IP blocks by lowering the total numbers of wires connecting the different IP blocks. As a result of lowering the total number of wires, manufacturing wire failure yield is also improved.

Power efficiency is also boosted by allowing the various IP blocks to send and receive short bursts of data independently from each other (Master Interface can potentially send a quick burst of data and power down, while the Slave Interface on the other side is still in power down state) due to the intrinsic memory characteristic of the Chronos Channel, and the handling of the communication protocol by the Chronos slave and master controllers 362 and 363.

FIG. 6A illustrates an exemplary implementation of a standard register to register interface 600 commonly used in ASIC design to dynamically change IP configuration settings for different modes of operation. The register configuration usually does not require a complete handshake. The register interface 600 includes a transmit register 610 linked to a receive register 620 via a channel.

FIG. 6B illustrates an exemplary implementation of a register interface 650 with Chronos Link (a combination of a Chronos Channel plus a Chronos Register Controller) according to various embodiments. FIG. 6B shows an implementation of a Chronos Link (651) to perform the same configuration register exchange between the TX Register (610) and the RX Register (620).

In one embodiment a Chronos Link (651) composed of a Chronos Channel (361) fully disclosed in a separate utility patent 9977852 plus a Chronos Register Controller (652). A Chronos Link links the transmit register 610 and the receive register 620 and brings all the advantages of Chronos Channels to a communication protocol, allowing independent clock references for Master and Slave IP blocks, PVT tolerance, simplified floorplan, enhanced yield, data time compression (with potential for minimize routing).

Figure 5C:
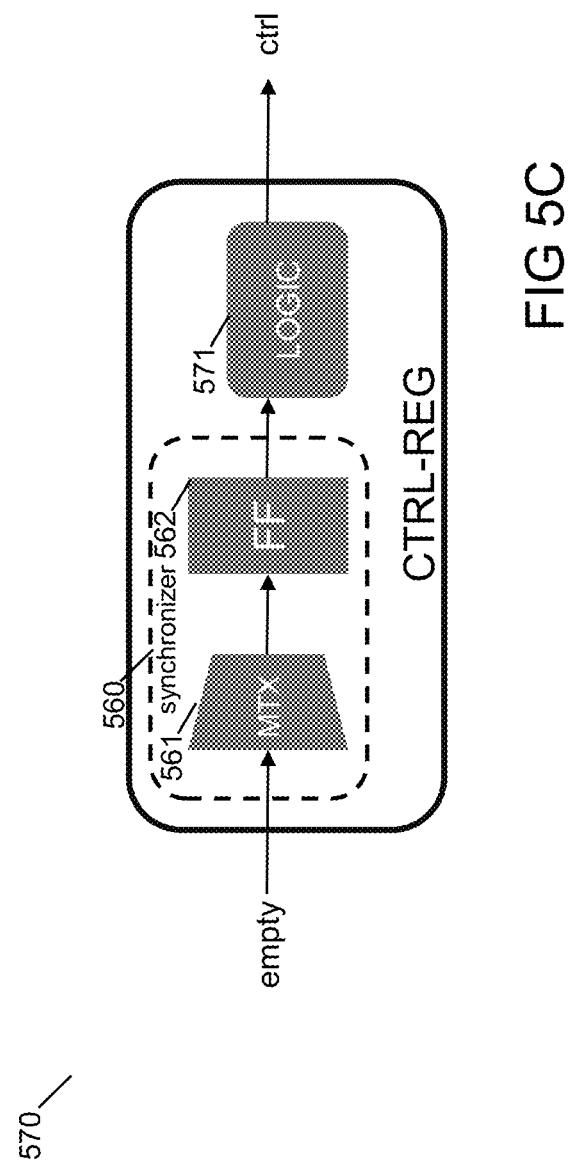
FIG. 5C illustrate an exemplary embodiment of the Chronos Register Controller.

FIG. 5C is a block diagram illustrating a Chronos Register Controller 570 according to various embodiments. The most important element in the controller is the synchronizer 560 which is responsible for the synchronization of the asynchronous signals coming from the TX register 610 via Chronos Channel 361 in the asynchronous domain (in particular empty) and being transformed to the synchronous domain of the RX register 620. Depending on Medium Time Between Failures (MTBF) requirement the physical implementation of the synchronizer 560 can change. An exemplary embodiment of the circuit is represented in FIG. 5C 570 composed of a Mutex (561) followed by a Flip-Flop (562). Other embodiments can be implemented such as replacing the Mutex with a second Flip-Flop, or a composition of a "n" number of alternating latches, and or a combinations of the above elements, trading latency performance for MTBF performance.

Figure 11:
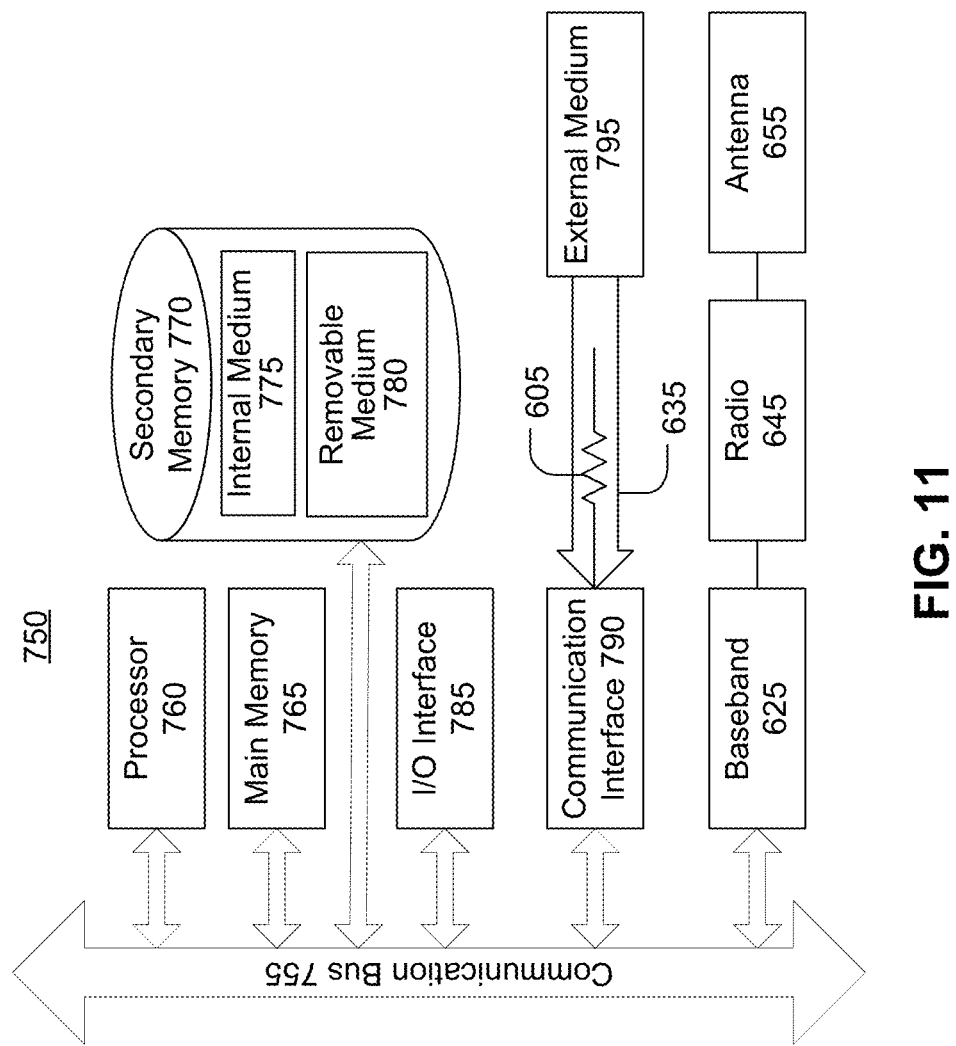
FIG. 11 is a block diagram illustrating an exemplary wired or wireless system according to various embodiments.

FIG. 11 is a block diagram illustrating a wired or wireless system 750 according to various embodiments that may utilize the systems and various types of links and channels described above in reference to the other Figures. In various embodiments, the system 750 may be a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 750 preferably includes one or more processors, such as processor 760. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 760.

The processor 760 is preferably connected to a communication bus 755. The communication bus 755 may include a data channel for facilitating information transfer between storage and other peripheral components of the system 750. The communication bus 755 further may provide a set of signals used for communication with the processor 760, including a data bus, address bus, and control bus (not shown). The communication bus 755 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The system 750 preferably includes a main memory 765 and may also include a secondary memory 770. The main memory 765 provides storage of instructions and data for programs executing on the processor 760. The main memory 765 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 770 may optionally include an internal memory 775 and/or a removable medium 780, for example a floppy disk drive, a magnetic tape drive, a compact disc ("CD") drive, a digital versatile disc ("DVD") drive, etc. The removable medium 780 is read from and/or written to in a well-known manner. Removable medium 780 may be, for example, a floppy disk, magnetic tape, CD, DVD, SD card, etc.

The removable medium 780 is a non-transitory computer readable medium having stored thereon computer executable code (i.e., software) and/or data. The computer software or data stored on the removable medium 780 is read into the system 750 for execution by the processor 760.

In alternative embodiments, secondary memory 770 may include other similar means for allowing computer programs or other data or instructions to be loaded into the system 750. Such means may include, for example, an external medium 795 and a communication interface 790. Examples of external medium 795 may include an external hard disk drive or an external optical drive, or and external magneto-optical drive.

Other examples of secondary memory 770 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are a removable medium 580 and a communication interface 790, which allow software and data to be transferred from an external medium 795 to the system 750.

The system 750 may also include an input/output ("I/O") interface 785. The I/O interface 785 facilitates input from and output to external devices. For example the I/O interface 785 may receive input from a keyboard or mouse and may provide output to a display. The I/O interface 785 is capable of facilitating input from and output to various alternative types of human interface and machine interface devices alike.

The communication interface 790 allows software and data to be transferred between system 750 and external devices (e.g. printers), networks, or information sources. For example, computer software or executable code may be transferred to system 750 from a network server via communication interface 790. Examples of communication interface 790 include, for example, but not limited to, a modem, a network interface card ("NIC"), a wireless data card, a communications port, a PCMCIA slot and card, an infrared interface, and an IEEE 1394 fire-wire.

The communication interface 790 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 790 are generally in the form of electrical communication signals 605. In one exemplary embodiment, these electrical communication signals 605 are provided to the communication interface 790 via a communication channel 635. In one embodiment, the communication channel 635 may be a wired or wireless network, or any variety of other communication links. The communication channel 635 carries the electrical communication signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 765 and/or the secondary memory 770. Computer programs can also be received via communication interface 590 and stored in the main memory 765 and/or the secondary memory 770. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 750. Examples of these media include the main memory 765, the secondary memory 770 (including the internal memory 775, the removable medium 780, and the external medium 795), and any peripheral device communicatively coupled with the communication interface 790 (including a network information server or other network device). These non-transitory computer readable mediums are means for providing executable code, programming instructions, and software to the system 750.

In one embodiment implemented using software, the software may be stored on a computer readable medium and loaded into the system 750 by way of the removable medium 780, the I/O interface 785, or the communication interface 790. In such an embodiment, the software is loaded into the system 750 in the form of electrical communication signals 605. The software, when executed by the processor 760, preferably causes the processor 760 to perform the inventive features and functions previously described herein.

The system 750 also includes optional wireless communication components that facilitate wireless communication over a voice and over a data network. The wireless communication components comprise an antenna system 655, a radio system 645 and a baseband system 625. In the system 750, radio frequency ("RF") signals are transmitted and received over the air by the antenna system 655 under the management of the radio system 645.

In one embodiment, the antenna system 655 may comprise one or more antennae and one or more multiplexors (not shown) that perform a switching function to provide the antenna system 655 with transmit and receive signal paths. In the receive path, received RF signals can be coupled from a multiplexor to a low noise amplifier (not shown) that amplifies the received RF signal and sends the amplified signal to the radio system 645.

In alternative embodiments, the radio system 645 may comprise one or more radios that are configured to communicate over various frequencies. In one embodiment, the radio system 645 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 645 to the baseband system 625.

If the received signal contains audio information, then baseband system 625 decodes the signal and converts it to an analog signal. Then the signal is amplified and sent to a speaker. The baseband system 625 may also receive analog audio signals from a microphone. These analog audio signals are converted to digital signals and encoded by the baseband system 625. The baseband system 625 also codes the digital signals for transmission and generates a baseband transmit audio signal that is routed to the modulator portion of the radio system 645. The modulator mixes the baseband transmit audio signal with an RF carrier signal generating an RF transmit signal that is routed to the antenna system 655 and may pass through a power amplifier (not shown). The power amplifier amplifies the RF transmit signal and routes it to the antenna system 655 where the signal is switched to the antenna port for transmission.

The baseband system 625 may also be communicatively coupled with the processor 760. The processor 760 has access to main memory 765 and/or secondary memory 770. The processor 760 is preferably configured to execute instructions (i.e., computer programs or software) that can be stored in the main memory 765 or the secondary memory 770. Computer programs can also be received from the baseband system 625 and stored in the main memory 765 or in secondary memory 770, or executed upon receipt. Such computer programs, when executed, enable the system 750 to perform the various functions of the present invention as previously described. For example, the main memory 765 may include various software modules (not shown) that are executable by processor 760.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An integrated circuit comprising:
 a communication channel coupled between a first interface and a second interface for transmission of asynchronous data between the first and second interfaces, the communication channel is configured to divide a cycle time into a plurality of temporal slots based on a temporal compression ratio, serially distribute portions of the asynchronous data into the plurality of temporal slots, and serially transmit the temporally compressed asynchronous data via the communication channel;

a controller communicatively coupled to the communication channel and to the second interface, the controller configured to:
   receive an asynchronous signal from the communication channel,
   transform the received asynchronous signal into a synchronous domain, and
   control the transmission of data according to a protocol corresponding to the first interface,
wherein the cycle time limits a duration of time for the first interface to transmit the input data signals and the second interface to form a representation of the input signals.

2. The integrated circuit of claim 1, wherein communication channel is further configured to encode data using delay insensitive coding and transmit the encoded data using a quasi-delay insensitive logic circuit.

3. The integrated circuit of claim 1, wherein the temporal compression ratio is a clock-less temporal compression ratio.

4. The integrated circuit of claim 1, wherein the communication channel is configured to translate a traditional handshake communication protocol into a compressed delay insensitive communication protocol where new control signals are not propagated to the channel but embedded into the data itself.

5. The integrated circuit of claim 1, wherein the communication channel is a point-to-point communication channel.

6. The integrated circuit of claim 1, wherein the communication channel communicatively couples the first interface to a plurality of interfaces comprising the second interface, wherein the controller comprises a plurality of controllers, each controller communicatively coupled to the communication channel and to a different interface of the plurality of plurality of interfaces.

7. The integrated circuit of claim 2, wherein the delay insensitive coding comprises analog signals.

8. The integrated circuit of claim 1, wherein the first interface is coupled to a producer block and the second interface is coupled to a consumer block, wherein data is transmitted from the producer block to the consumer block.

9. The integrated circuit of claim 8, wherein the consumer and producer blocks are disposed on a common application specific integrated circuit chip.

10. The integrated circuit of claim 1, wherein the controller comprises a synchronizer circuit configured to receive the asynchronous signal from the communication channel and transform the received asynchronous signal into the synchronous domain.

11. The integrated circuit of claim 10, wherein the controller comprises a digital logic circuit configured to create a first control signal and, using digital logic, regulate the transmission of data into the communication channel.

12. The integrated circuit of claim 11, wherein the synchronizer comprises a flip-flop circuit communicatively coupled to the digital logic circuit and configured to transmit the transformed asynchronous signal to the digital logic circuit.

13. The integrated circuit of claim 1, further comprising a second controller communicatively coupled to the communication channel and to the first interface, the second controller configured to:
   receive an asynchronous signal from the communication channel,
   transform the received asynchronous signal into a synchronous domain, and
   control the transmission of data according to a protocol corresponding to the second interface.

14. The integrated circuit of claim 13, wherein the communication channel communicatively couples a plurality of first interfaces to a plurality of second interfaces, wherein the controller comprises a plurality of controllers, each controller communicatively coupled to the communication channel and a different second interface of the plurality of second interfaces, and the second controller comprises a plurality of second controllers, each second controller communicatively coupled to the communication channel and to a different first interface of the plurality of first interfaces.

15. The integrated circuit of claim 13, wherein the communication channel communicatively couples the second interface to a plurality of interfaces comprising the first interface, wherein the second controller comprises a plurality of second controllers, each second controller communicatively coupled to the communication channel and to a different interface of the plurality of interfaces.

16. The integrated circuit of claim 1, wherein the communication channel is configured to transmit register information between the first and second interfaces, the register information comprising data for configuring a mode of operation of an intellectual property block coupled to the second interface.

17. The integrated circuit of claim 16, wherein the controller is a register controller comprising:
   a synchronizer circuit configured to receive the asynchronous signal from the communication channel and transform the received asynchronous signal into the synchronous domain, and
   a digital logic circuit configured to create a control signal comprising the data for configuring a mode of operation and transmit the control signal over the communication channel using digital logic.

* * * * *